United States Patent [19]
Sorensen

[11] 4,333,312
[45] * Jun. 8, 1982

[54] THERMODYNAMIC ENERGY CONVERSION SYSTEM AND METHOD, UTILIZING A THERMODYNAMIC WORKING FLUID OF ENCASED EXPANDITES

[75] Inventor: Jens O. Sorensen, Rancho Santa Fe, Calif.

[73] Assignee: Trade Finance International, Georgetown, Cayman Islands

[*] Notice: The portion of the term of this patent subsequent to Jul. 29, 1997, has been disclaimed.

[21] Appl. No.: 123,491

[22] Filed: Mar. 10, 1980

Related U.S. Application Data

[63] Continuation-in-part of Ser. No. 25,800, Apr. 2, 1979, Pat. No. 4,214,449.

[51] Int. Cl.³ .............................................. F03G 7/06
[52] U.S. Cl. ................................ 60/641.7; 417/52; 417/321; 60/530
[58] Field of Search ................ 60/398, 641.7, 530, 60/531; 417/52, 207, 321

[56] References Cited

U.S. PATENT DOCUMENTS

| | | | |
|---|---|---|---|
| 4,104,883 | 8/1978 | Naef | 60/641.7 |
| 4,214,449 | 7/1980 | Sorensen | 60/641.7 |
| 4,233,813 | 11/1980 | Simmons | 60/641.7 |

Primary Examiner—Allen M. Ostrager
Attorney, Agent, or Firm—Brown & Martin

[57] ABSTRACT

A thermodynamic energy conversion system includes a thermodynamic working fluid made up of thousands of expandites at a given pressure to thereby change buoyancy with respect to a thermal fluid; a mass transport conduit circuit for introducing the expandites to a thermal fluid at different combinations of temperature and pressure and transporting the thermodynamic working fluid and thermal fluid in response to pressure differentials created by concomitant buoyancy volume and density changes of the expandites as the thermodynamic working fluid is exposed to thermal fluid at different combinations of pressure and temperature; and a transducer for converting the pressure of fluid transported by the circuit to a useful form of energy. Expandites are separate objects each of which includes a mass having a flexible covering encasing the mass for enabling rapid heat transfer between the mass and the thermal fluid, for enabling the encased mass to maintain its integrity as a separate object when submerged in the thermal fluid, and for enabling the volume of the encased expandite to change in accordance with the characteristic interdependent relationship between changes in the density, temperature and pressure of the mass when the encased expandite is submerged in the thermal fluid.

18 Claims, 8 Drawing Figures

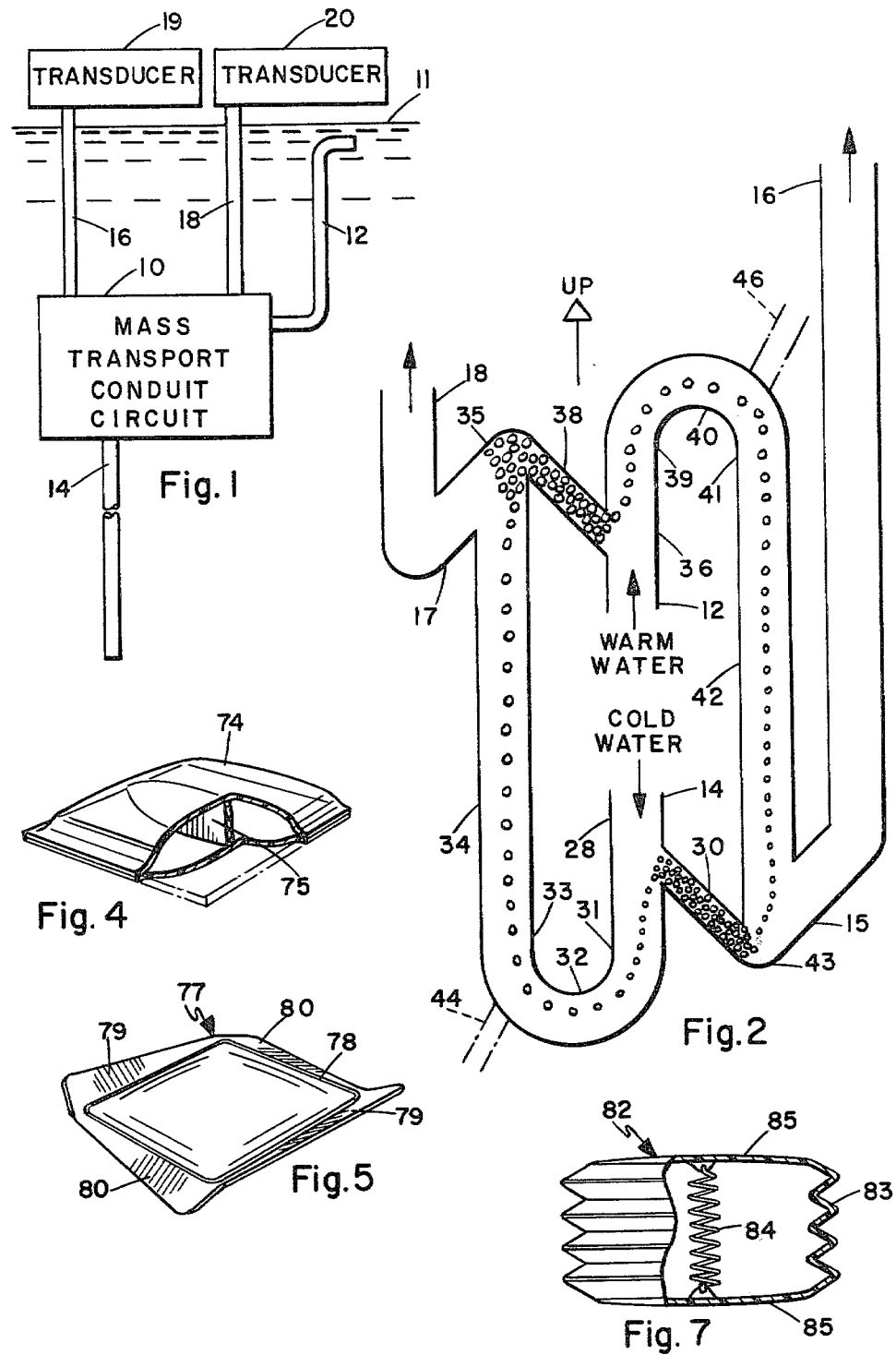

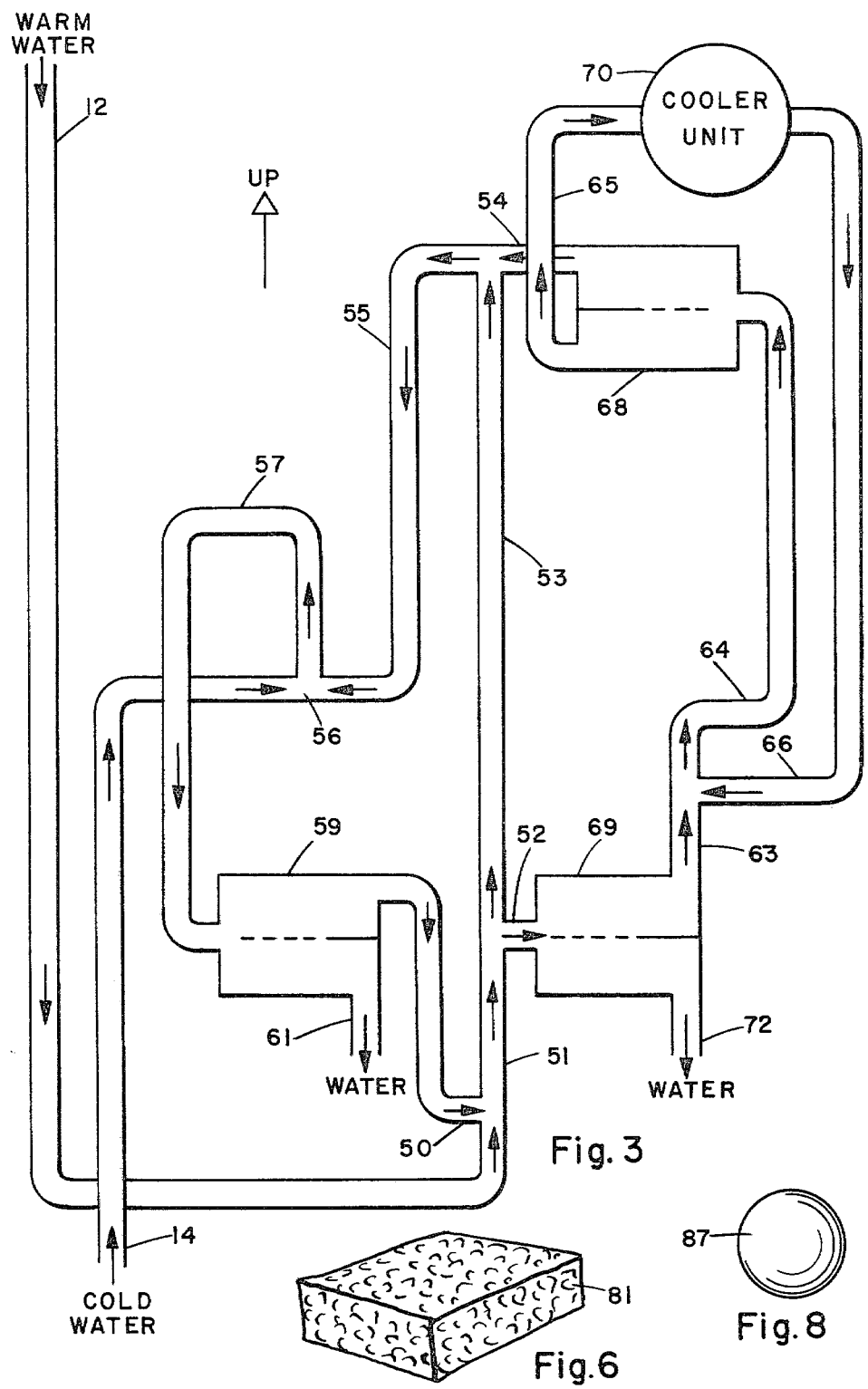

4,333,312

THERMODYNAMIC ENERGY CONVERSION SYSTEM AND METHOD, UTILIZING A THERMODYNAMIC WORKING FLUID OF ENCASED EXPANDITES

CROSS REFERENCE TO RELATED APPLICATION

This is a continuation-in-part of application No. 25,800 filed Apr. 2, 1979 now U.S. Pat. No. 4,214,449 for "Thermal Energy Conversion System Utilizing Expandites."

FIELD OF THE INVENTION

The present invention pertains to Thermodynamic energy conversion systems, such as ocean thermal energy conversion systems, and to a novel thermodynamic working fluid for use in thermodynamic energy conversion systems.

In thermodynamic energy conversion systems, heat is transferred between the working fluid and a thermal fluid. In most such systems, the working fluid does not make direct contact with the thermal fluid, but is conveyed through a heat exchanger that includes conduit sections which are contacted by the thermal fluid. The working fluid may be either heated or cooled by the thermal fluid. The term working fluid applies to both heating fluids and refrigerants. In some systems the working fluid is transported after its heat exchange with the thermal fluid to a remote location in order to change the temperature of another substance at a remote location through another heat exchange. In other systems, the thermal change of the working fluid is converted into mechanical energy. In still other systems mechanical energy is used to change the temperature of the working fluid.

Heat exchangers are used in most thermodynamic energy conversion systems because when a typical working fluid makes direct contact with the thermal fluid there is a tendency for one fluid to become dissolved or dispersed in the other and the fluids lose their separate integrities, whereby they are not readily separated and the efficiency of the thermodynamic energy conversion process diminishes. However, heat exchangers are expensive and there is also the cost of cleaning and maintaining heat exchangers. Further they are subject to corrosion, especially when the thermal fluid is salt water, as in an ocean thermal energy conversion system.

In typical ocean thermal energy conversion systems, a thermal fluid, such as warm surface water, is used to heat a thermodynamic working fluid. The working fluid is heated in a boiler. Vapor released from the boiler turns a turboelectric generator. The Vapor is then cooled by a thermal fluid, such as frigid water, that is drawn up from deep in the ocean. The vapor condenses, and is pressurized and returned to the boiler; and the cycle is repeated.

One concern with typical ocean thermal energy conversion systems, is their relatively low efficiency, which is affected significantly by the fact that considerable energy is expended in pumping the water and the working fluid throughout the system.

Another concern with typical ocean thermal energy conversion systems, is "blofouling", which is the growth of algae on heat exchangers. Blofouling absorbs energy from the system.

SUMMARY OF THE INVENTION

The present invention provides a novel thermodynamic working fluid of encased expandites and further provides a thermodynamic energy conversion system and method utilizing a thermodynamic working fluid of expandites for converting a relatively low temperature differential in thermal fluids into useful form of energy at a minimum of capital investment, cost and maintenance.

Although the present invention is particularly directed to an ocean thermal energy conversion system, it also is applicable to other types of thermodynamic energy conversion systems, including those in which the thermal fluid is other than water.

The thermodynamic energy conversion system of the present invention includes thermodynamic working fluid made up of thousands of expandites that change density and volume in response to changes in temperature at a given pressure; a mass transport conduit circuit for introducing the thermodynamic working fluid to a thermal fluid at different combinations of temperature and pressure and for transporting the working fluid and the thermal fluid in response to pressure differentials created as the thermodynamic working fluid is exposed to the thermal fluid at different combinations of pressure and temperature; and a transducer for converting the pressure of fluid transported by the circuit to a useful form of energy. Expandites are separate objects that expand or contract when heated or cooled, thereby changing their density. Some expandites expand upon being heated, while others expand upon being cooled. As a separate object each expandite maintains its integrity with respect to the thermal fluid, whereby it is not broken up and dissolved or dispersed in the thermal fluid upon being introduced to the thermal fluid.

When the expandites have a lower or higher density than the thermal fluid, they will be buoyant or nonbuoyant respectively, and will rise or sink, thereby creating a pressure differential in the fluid which causes movement of the fluid through propulsion and suction. This is the same effect as is created by a propeller.

The novel thermodynamic working fluid of the present invention includes thousands of encased expandites, each of which includes a mass having a flexible covering encasing the mass for enabling rapid heat transfer between the mass and the thermal fluid, for enabling the encased expandite to maintain its integrity as a separate object when submerged in the thermal fluid, and for enabling the volume of the encased expandite to change in accordance with the characteristic interdependent relationship between changes in the density, temperature and pressure of the mass when the encased expandite is submerged in the thermal fluid.

The encased mass preferably is a material that experiences a pronounced change in density or volume in response to changes in temperature at a given pressure. Referred materials are carbon dioxide, ethane, ethylene, butane, propane, benzene, ammonia and nitro benzene. These materials usually are in a fluid state of some of the prevailing temperatures and pressures in thermodynamic energy conversion system. Yet by encasing such materials, they can be kept from dissolving or becoming so dispersed in the thermal fluid that they are not readily separated from the thermal fluid.

The encased expandites may readily be separated from the thermal fluid. Accordingly, the working fluid is not lost by merger into the thermal fluid and may be reused in subsequent process cycles following each separation. Also, the expense of a heat exchanger and the costs of cleaning and otherwise maintaining a heat exchanger may be avoided.

Other features and various advantages of the present invention are discussed in relation to the description of the preferred embodiments.

BRIEF DESCRIPTION OF THE DRAWING

FIG. 1 is a schematic block diagram of an ocean thermal energy conversion system according to the present invention.

FIG. 2 is a schematic diagram of a preferred embodiment of the system of the present invention utilizing a thermodynamic working fluid made up of expandites that expand upon being cooled and undergo a buoyancy reversal with respect to ocean water at a given sub-surface ocean temperature.

FIG. 3 is a schematic diagram of a preferred embodiment of the system of the present invention utilizing a thermodynamic working fluid made up of expandites that are buoyant in ocean water and expand upon being heated.

FIGS. 4, 5, 6, 7 and 8 are perspective views of different alternative preferred embodiments of encased expandite coverings.

DESCRIPTION OF THE PREFERRED EMBODIMENTS

Referring to FIG. 1, the mass transport conduit circuit 10 is deployed beneath the ocean surface 11 at a depth that is dependent upon the characteristic phase properties and interdependent relationship between changes in density, temperature and pressure of the expandite mass of the expandites.

The mass transport conduit circuit 10 includes a warm water intake conduit 12 which extends to near the ocean surface 11, a cold water intake conduit 14 which extends deep into the ocean, a warm water exhaust conduit 16 and a cold water exhaust 18. The warm water exhaust conduit 16 and the cold water exhaust conduit 18 are coupled to transducers 19 and 20 which convert the pressure of the water transported to the surface in the conduits 16 and 18 into a useful form of energy. Turboelectric generators are preferred as transducers. However, other transducers may be used to convert the pressure of the water flow to other forms of energy, such as hydrogen, for example, and such as discussed with relation to the system of FIG. 3.

One preferred embodiment of an ocean thermal energy conversion system according to the present invention is described in relation to FIG. 2. In the embodiment shown in FIG. 2, the thermodynamic working fluid includes thousands of encased expandites that have the properties of becoming less dense with a decrease in temperature at a given pressure and undergoing a reversal in buoyancy with respect to ocean water at a given combination of sub-surface ocean temperature and pressure. The encased expandites are shown throughout FIG. 2 as circles of various sizes which are exaggerated to illustrate contraction and expansion. The preferred encased expandite mass material is nitro benzene which undergoes a phase transformation from a liquid to a solid and a buoyancy change at approximately 9° C.

The mass transport conduit circuit includes a cold water intake conduit 14, a first vertical conduit 28, a first oblique conduit 30, a first U-shaped conduit 32, a second vertical conduit 36, a second oblique conduit 38, a second U-shaped conduit 40, a fourth vertical conduit 42, a cold water exhaust conduit 18 and a warm water exhaust conduit 16. The system is deployed in the ocean where the surface water temperature is sufficiently greater than the given temperature at which the encased expandites undergoes a buoyancy reversal.

The cold water intake conduit 14 extends to an ocean depth where the water temperature is substantially below the given sub-surface ocean temperature for introducing cold water from such depth into the circuit. The ocean water temperature is approximately 4° C. at a depth of approximately 800 meters.

The first vertical conduit 28 is coupled to the cold water intake conduit 14 for receiving the cold water.

The first oblique conduit 30 is coupled to the first vertical conduit 28 below the cold water intake conduit 14, and is slanted downward with respect to the first vertical conduit 28 for gradually introducing into the first vertical conduit 28, expandites flowing from the remainder of the circuit that are at a temperature that causes them to be non-buoyant with respect to ocean water. As a result, the expandites fall within the first vertical conduit 28 upon introduction thereto.

The first U-shaped conduit 32 has an inlet end 31 coupled to the bottom of the first vertical conduit 28 and an outlet end 33, that extends vertically for enabling expandites falling from the first vertical conduit 28 to flow upward from the outlet end 33 of the first U-shaped conduit 32 as the expandites expand upon becoming less dense and thereby become buoyant in response to contact with the cold water.

The second vertical conduit 34 is for transporting the buoyant expandites and the water vertically upward in response to a pressure differential created in the water flowing through the circuit by the expansion of the expandites.

The warm water intake conduit 12 extends to near the ocean surface 11 for introducing warm water having a temperature substantially above the given sub-surface ocean temperature into the circuit from the surface.

The third vertical conduit 36 is coupled to the warm water intake conduit 12 for receiving warm water.

The second oblique conduit 38 is coupled to the third vertical conduit 36 above the warm water intake conduit 12, and is slanted downward from the second vertical conduit 34 to the third vertical conduit 36, for collecting expandites rising within the second vertical conduit 34 and for gradually introducing the collected expandites into the third vertical conduit 36. The expandites rise within the third vertical conduit 36 upon introduction thereto.

The second U-shaped conduit 40 has an inlet end 39 coupled to the top of the third vertical conduit 36 and an outlet end 41 that extends vertically for enabling expandites rising from the third vertical conduit 36 to flow downward from the outlet end 41 of the second U-shaped conduit 40, as the expandites contract upon becoming more dense and thereby become non-buoyant in response to contact with the warm water.

The fourth vertical conduit 42 is coupled to the outlet of the second U-shaped conduit 40 for transporting the non-buoyant expandites and the water vertically downward in response to a pressure differential created in the water flowing through the circuit by the contraction of the expandites. The bottom 43 of the fourth vertical conduit 42 is coupled to the lower end of the first oblique conduit 30 for enabling expandites which have fallen through the fourth vertical conduit 42 to be forced up into the first oblique conduit 30 in response to pressure created by water flowing downward through the fourth vertical conduit 42.

The cold water exhaust conduit 18 is coupled near the top 35 of the second vertical conduit 34 below the second oblique conduit 38 for transporting the cold water from the second vertical conduit 34 upward to the transducer 20. (FIG. 1). The cold water exhaust conduit 18 is coupled to the second vertical conduit 34 by an oblique section 17 of the cold water exhaust conduit that slants downward from the second vertical conduit 34, to prevent expandites from being drawn into the exhaust conduit 16. Alternatively, or in addition thereto, a screen may be placed over the inlet to the conduit 17.

The warm water exhaust conduit 16 is coupled near the bottom 43 of the fourth vertical conduit 42 above the first oblique conduit 30 for transporting the warm water from the fourth vertical conduit 42 upward to the transducer 19. The warm water exhaust conduit 16 is coupled to the fourth vertical conduit 42 by an oblique section 15 of the warm water exhaust conduit 16, that slants upward from the fourth vertical conduit 42 to prevent expandites from being drawn into the exhaust conduit 16. Alternatively, or in addition thereto, a screen can be placed over the inlet to the conduit 15.

The system of FIG. 2 alternatively may also include a second cold water exhaust conduit 44 and a second warm water exhaust conduit 46.

The second cold water exhaust conduit 44 is coupled to the circuit near the outlet end 33 of the first U-shaped conduit 32 at a depth where the absolute pressure in the circuit is slightly greater than the absolute pressure in the ocean. The second cold water exhaust conduit 44 is slanted downward from the circuit for exhausting some of the cold water to increase the proportion of expandites to cold water in the second vertical conduit 34 above to thereby increase the upward flow pressure of the water and expandites in the second vertical conduit 34.

The second warm water exhaust conduit 46 is coupled to the circuit near the outlet end 41 of the second U-shaped conduit 40 at a depth where the absolute pressure in the circuit is slightly greater than the absolute pressure in the ocean. The second warm water exhaust conduit 46 is slanted upward from the circuit for exhausting some of the warm water to increase the proportion of expandites to warm water in the fourth vertical conduit 42 below to thereby increase the downward flow pressure of the water and expandites in the fourth vertical conduit 42.

The system of FIG. 2 can be used with encased expandites that have the properties of becoming less dense with an increase in temperature at a given pressure and undergoing a reversal in buoyancy with respect to ocean water at a given combination of sub-surface ocean temperature and pressure by reversing the respective connections of the warm water intake conduit 12 and the cold water intake conduit 14 to the remainder of the circuit.

Another preferred embodiment of an ocean thermal energy conversion system according to the present invention is described in relation to FIG. 3.

In the embodiment shown in FIG. 3, the expandites have the properties of being buoyant in ocean water, becoming less dense with an increase in temperature at a given pressure and undergoing a substantial change in buoyancy with respect to ocean water at a given combination of sub-surface ocean temperature and pressure. Preferred expandite mass materials include carbon dioxide and ethane. These expandite mass materials vaporize at temperatures above a given sub-surface ocean temperature at the highest pressure in the circuit and condense at temperatures below a given sub-surface ocean temperature at the lowest pressure in the circuit. The expandites are buoyant with respect to ocean water when the encased expandite mass materials is either its gaseous state or its liquid state. Accordingly, in the embodiment of FIG. 3, whenever a mixture of the expandites and water is flowing vertically in a conduit section, the buoyancy of the expandites will create a pressure differential that propels the flow of the mixture upward through the conduit. Downward flow through a vertical conduit section is created when dictated by pressure differentials in the remainder of the circuit.

Referring to the system of FIG. 3, the mass transport conduit circuit includes a warm water intake conduit 12, a cold water intake conduit 14, conduit sections 50, 51, 52, 53, 54, 55 and 57; gravity separation unit 59 and outlet conduit 61. The transducer includes conduit sections 63, 64, 65 and 66, gravity separation units 68 and 69, a cooler unit 70 and an outlet conduit 72.

The thermodynamic working fluid including thousands of encased expandites is provided in the conduit 50 at a temperature and pressure where the encased expandite mass material is in a liquid state. The working fluid in conduit section 50 is combined with warm water drawn from near the ocean surface through the intake conduit 12 to provide a first mixture of expandites and water that flows upward through the conduit section 51. As the first mixture flows through conduit 51, some of the heat from the warm water is transferred to the encased expandites and causes the encased expandite mass to change into a gaseous state. As a result, the density of the encased expandites decreases and the buoyancy of the encased expandites increases to create a pressure differential in the conduit 51 that propels the flow of the first mixture up through the conduit 51.

At its upper end, the conduit section 51 divides into two conduit sections 52 and 53, and some of the first mixture flows through each of these two conduit sections 52 and 53. The portion of the first mixture of expandites and water that flows through the conduit section 52 flows into the gravity separation unit 69, which is a part of transducer of the thermodynamic energy conversion system. The expandites are more buoyant than the water in the first mixture and thereby flow from the top of the separation unit 69 through the conduit section 63, whereas water is separated from the expandites of the first mixture, flows from the bottom of the separation unit 69, and is discharged from the system through the outlet conduit 72.

Heated antifreeze, such as ethylene glycol, provided in the conduit section 66 is combined with the expandites in the conduit section 63 to provide a second mixture of expandites and antifreeze that flows upward through the conduit section 64 to the gravity separation unit 68. As the second mixture flows vertically upward through the conduit section 64 the absolute pressure of the second mixture decreases, whereby the gaseous encased expandite mass expands further and becomes cooler. Some of the heat from the antifreeze in the second mixture is transferred to the expandites to thereby cool the antifreeze.

As the density of the encased expandites in the second mixture decreases, the encased expandites become more buoyant to create a pressure differential in the conduit section 64 to propel the flow of the second mixture upward through the conduit section 64.

In the gravity separation unit 68, the denser antifreeze is separated from the second mixture and flows from the bottom of the separation unit 68 through the conduit section 65 into the cooler unit 70. The cooler unit 70 transfers heat to the antifreeze, whereby the antifreeze becomes hotter and produces a cooling effect. The heated antifreeze flows from the cooler unit 70 through the conduit section 66, from which the heated antifreeze is combined again with expandites flowing from the conduit 63 as described above.

In the gravity separation unit 68, the more buoyant expandites are separated from the second mixture and flow from the top of the separation unit 68 through the conduit section 54. The expandites in the conduit section 54 are combined with the portion of the first mixture flowing upward through the conduit section 53 to provide a third mixture of expandites and water that flows through the conduit section 55.

As the first mixture flows vertically upward through the conduit section 53, the density of the expandites is very low, whereby the expandites in the conduit section 53 are buoyant and create a pressure differential in the conduit section 53, that propels the flow of the first mixture upward through the conduit section 53. The pressure of the upward flow of the first and second mixture in the conduit sections 53 and 64 is great enough to cause the third mixture of expandites and water to flow downward through the conduit section 55. As the third mixture flows downward through the conduit section 55, the absolute pressure of the third mixture increases and the gaseous encased expandite mass compresses to become warmer. However, the expandites give up some of this increased heat to the water in the third mixture.

Cold ocean water drawn from the ocean depths through the intake conduit 14 is combined with the third mixture flowing in the conduit section 55 to provide a fourth mixture of expandites and water that flows upward through the conduit section 57. As the fourth mixture flows upward through the conduit section 57 from the junction 56 of conduit sections 14 and 55, some of the heat of the encased expandite mass is transferred to the cold water to thereby change the encased expandite mass from a gaseous state to a liquid state. However, the change of the expandite mass from a gas to a liquid occurs gradually. As the expandites in the fourth mixture flow upward in the conduit section 57 from the junction 56 they are still buoyant with respect to the water and thereby create a pressure differential in the conduit section 57 to propel the flow of the fourth mixture upward through the conduit section 57 from the junction 56.

The conduit 57 then turns downward and causes the fourth mixture to flow vertically downward into the gravity separation unit 59.

In the gravity separation unit 59 the expandites are buoyant with respect to the water in the fourth mixture. Water flows from the bottom of the separation unit 59 and is discharged from the system through the outlet conduit 61. The expandites in the fourth mixture flow from the top of the separation unit 59 through the conduit 50, from which they are again combined with warm ocean water flowing in through the intake conduit as discussed above.

In the embodiment previously described herein, in order to prevent thermal pollution at the ocean surface, the water exhausted from the water exhaust conduits may be piped down to the sub-surface ocean level that has the same temperature as the exhausted water.

Various preferred embodiments of individual encased expandites are described with reference to FIGS. 4 through 8.

Preferred expandite mass materials include carbon dioxide, ethane, ethylene, butane, propane, benzene, ammonia and nitro benzene.

The flexible expandite coverings are a material that is insoluble in both the expandite mass material and the thermal fluid. For the preferred expandite mass materials listed above and a thermal fluid of ocean water, the flexible coverings preferably are durable materials, such as polypropylene, polyethylene and rubber. A flexible covering enables the expandite to readily expand or contract its encased volume in accordance with ambient pressure and temperature changes. The surface of the expandite covering can be elastic and stretch or contract but it does not have to have such property. An elastic material prevents the pressure within the encased expandite from equalizing with the outside pressure except within a given pressure range, which may be advantageous depending upon the desired thermodynamics of the system. Alternatively, the covering can merely be flexible and only partially filled, whereby it can be inflated as the encased expandite mass material expands. The material used for the flexible cover typically is relatively thin to enable rapid heat transfer.

Referring to FIG. 4, in one preferred embodiment, the expandite covering is a plastic bag 74 having a relatively square configuration in two dimensions. The flexible covering typically is thin in the third dimension when inflated to provide a large surface area in relation to the volume of the covering to thereby provide a rapid transfer of heat between the encased material and the thermal fluid. The bag 74 has a drag inducing configuration with respect to a thermal fluid such as water and an outside surface that is configured to minimize drag with respect to the conduits.

When it is desired to provide an encased expandite having a characteristic interdependent relationship between changes in density, temperature and pressure other than that provided by a single commonly available encased expandite mass material (such as those listed above) two or more different materials having different characteristic interdependent relationships of such properties are encased in the individual expandite. The different materials may be mixed together or contained within segregated compartments, as defined by the partition 75 in the bag 74. In order to achieve wanted densities at a given pressure and temperature gradiant, it may be advantageous to have compartmentalized expandite units with different expandite mass materials in each compartment. It may be advantageous to adjust the average density of the encased expandite so as to obtain a buoyancy reversal at a given combination of temperatures and pressure, when such is desired. Water also may be mixed with the preferred expendite mass materials listed above to obtain the desired characteristic interdependent relationship. Phase shifts, solution-dissolution processes, and reversible chemical processes may occur within the interior of an encased expandite.

Referring to FIG. 5, the covering for an alternative preferred embodiment of an individual encased expandite consists of a bag 77 having a substantially polygonal sealed seam 78 with fins 79, 80 extending beyond the seam 78 for causing the encased expandite to spin and thereby drag as it moves through the thermal fluid. The fins 79 extend in one direction from the plane of the bag 77 and the fins 80 extend in the opposite direction. Fins can also be used to space the encased expandites from each other.

FIG. 6 shows an alternative preferred embodiment of an individual encased expandite wherein the covering includes a multicellular foam 81 for encasing the mass material within the cells. The multicellular foam may be a semi-rigid material that resists changes in the encased volume as the density of the encased mass varies. The semi-rigid structure of the encased expandite thereby may provide an advantageous characteristic interdependent relationship between changes in the density, temperature and pressure of the expandite, depending upon the desired thermodynamics of the system. A semi-rigid foam also prevents the pressure of the encased expandite mass from equalizing with the outside pressure except within a given pressure range.

Another embodiment of an encased expandite wherein the covering is a semi-rigid structure for resisting changes in the encased volume as the density of the encased mass varies, is shown in FIG. 7. The covering is a flexible bag 82 containing pleats 83 around its circumference and an interior member 84, such as a spring attached to the opposite end walls 85. The bag 82 is made of a relatively stiff material. When the volume of the encased expandite mass decreased, the bag 82 collapses but still displaces at least a minimum volume in the thermal fluid because the pleats and spring prevent the bag 82 from collapsing further. When the volume of the encased expendite mass increases the bag 82 expands, but only to a given maximum volume of displacement in the thermal fluid because of the restraint provided by the spring 84 and the pleats 83.

Another preferred configuration for individual encased expandites is spherical, such as shown in FIG. 8. The covering 87 may be an elastic material for encasing a gaseous or liquid expandite mass. Alternatively, the covering 87 and the enclosed mass both may consist of a single homogeneous material that has a high thermal coefficient of expansion.

In an alternative preferred embodiment, each encased expandite may contain a magnetically attractive material which would enable the movement or separation of the thermodynamic working fluid to be controlled by the application of a magnetic field.

In other alternative preferred embodiments, each encased expandite is either magnetized or electrically charged. A thermodynamic working fluid containing the magnetized or charged expandites can be used to induce or extract electrical or mechanical energy. For example, by passing the fluid through a conduit that is wound with an electrical coil. Also these properties may be utilized for separating the expandites from the thermal fluid and for otherwise directing the movement of the expandites.

In addition to gravity separation, the expandites can also be separated from the thermal fluid by centrifugal separation or by use of a porous membrane that passes the thermal fluid but not the expandites.

The individual encased expandites are very small so that they can flow readily through conventional turbines, pumps, heat exchangers, piston cylinders, separation units, conduits, etc.

Some of the terms previously used in the cross-referenced Application No. 25,800 have been changed in the present specification. The previously-used term "thermal energy conversion," has been changed to "thermodynamic energy conversion." The previously-used term "mass of expandites" has been changed to "thermodynamic working fluid." The previously-used term "surrounding fluid" has been changed to "thermal fluid." The previously-used term "expandite unit" has been changed to "encased expandite."

I claim:

1. A method of thermodynamic energy conversion comprising the steps of:
    (a) providing a thermodynamic working fluid that changes density and volume in response to changes in temperature at a given pressure;
    (b) introducing the thermodynamic working fluid to a thermal fluid at different combinations of temperature and pressure;
    (c) transporting the thermodynamic working fluid and the thermal fluid through a mass transport conduit circuit in response to pressure differentials created as the thermodynamic working fluid is exposed to the thermal fluid at different combinations of pressure and temperature; and
    (d) converting the pressure of the transported fluids to a useful form of energy,
    characterized by step (a) comprising the step of:
    (e) providing a thermodynamic working fluid that comprises thousands of encased expandites.

2. A method according to claim 1, characterized by step (a) comprises the step of:
    (f) providing a thermodynamic working fluid that changes density in response to changes in temperature at a given pressure to thereby change buoyancy with respect to a thermal fluid; and by
    step (c) further comprising the step of:
    (g) transporting the thermodynamic working fluid and the thermal fluid through the mass transport conduit circuit in response to pressure differentials created by concomitant buoyancy, volume and density changes of the expandites with respect to the thermal fluid.

3. A thermodynamic energy conversion system, comprising:
    a thermodynamic working fluid that changes density and volume in response to changes in temperature at a given pressure;
    a mass transport conduit circuit for introducing the thermodynamic working fluid to a thermal fluid at different combination of temperature and pressure and for transporting the thermodynamic working fluid and the thermal fluid in response to pressure differentials created as the thermodynamic working fluid is exposed to the thermal fluid at different combinations of pressure and temperature; and
    a transducer for converting the pressure of the fluid transported by the circuit to a useful form of energy;
    characterized by
    the thermodynamic working fluid comprising thousands of encased expandites.

4. A system according to claim 3, characterized by the working fluid comprising:
    a thermodynamic working fluid that changes density in response to changes in temperature at a given pressure to thereby change buoyancy with respect to a thermal fluid; and by the mass transport conduit circuit further comprising means for transporting the thermodynamic working fluid and the thermal fluid through the mass transport conduit circuit in response to pressure differentials created by concomitant buoyancy, volume and density changes of the expandites with respect to the thermal fluid.

5. A thermodynamic working fluid for use in combination with a thermal fluid in a thermodynamic energy conversion system comprising:

a working fluid made up of thousands of encased expandites, each of which includes a mass having a flexible covering encasing the mass for enabling rapid heat transfer between the mass and the thermal fluid, for enabling the encased expandite to maintain its integrity as a separate object when submerged in the thermal fluid, and for enabling the volume of the encased expandite to change in accordance with the characteristic interdependent relationship between changes in the density, temperature and pressure of the mass when the encased expandite is submerged in the thermal fluid.

6. A thermodynamic working fluid according to claim 5, wherein the encased expandites carry an electrical charge.

7. A thermodynamic working fluid according to claim 5, wherein the encased expandites include a magnetized material.

8. A thermodynamic working fluid according to claim 5, wherein the encased expandites include a magnetically attractive material.

9. A thermodynamic working fluid according to claim 5, wherein the covering for a said individual encased expandite includes a multicellular foam for encasing the mass within the cells.

10. A thermodynamic working fluid according to claim 5, wherein the covering and the mass for a said individual encased expandite consist of a single continuous homogenous material having a high thermal coefficient of expansion.

11. A thermodynamic working fluid according to claim 5, wherein the covering for the individual encased expandite consists of a bag having a substantially polygonal sealed seam with fins extending beyond the seam for causing the encased expandite to spin and thereby drag as it moves through the thermal fluid.

12. A thermodynamic working fluid according to claim 5, wherein the covering for a said individual encased expandite includes fins for causing the encased expandite to spin as it moves through the thermal fluid.

13. A thermodynamic working fluid according to claim 5, wherein the covering for a said individual encased expandite includes fins for spacing the encased expandite from other encased expandites in the workin fluid.

14. A thermodynamic working fluid according to claim 5, wherein the encased mass includes at least two different materials having different characteristic interdependent relationships between changes in density, temperature and pressure.

15. A thermodynamic working fluid according to claim 14, wherein the different materials are contained within segregated compartments.

16. A thermodynamic working fluid according to claim 5, wherein the covering for a said individual encased expandites is an elastic material for preventing the pressure within the encased expandite from equalizing with the outside pressure except within a given pressure range.

17. A thermodynamic working fluid according to claim 5, wherein a said individual encased expandite comprises:

a semi-rigid structure for resisting changes in volume as the density of the encased mass varies.

18. A thermodynamic working fluid according to claim 5, wherein the covering for a said individual encased expandite has a drag inducing configuration with respect to the thermal fluid and an outside surface that is configured to minimize drag with respect to conduits.

* * * * *